United States Patent [19]
Evans et al.

[11] 3,992,955
[45] Nov. 23, 1976

[54] TWO AXIS CAGING SYSTEM

[75] Inventors: John L. Evans, Oakland; Donald R. Boerner, Wayne, both of N.J.

[73] Assignee: The Singer Company, Little Falls, N.J.

[22] Filed: Nov. 18, 1974

[21] Appl. No.: 524,456

[52] U.S. Cl. .................................. 74/5.1; 74/5.12
[51] Int. Cl.² ........................................ G01C 19/24
[58] Field of Search ............... 74/5.1, 5.12, 5.14, 74/5.7

[56] References Cited
UNITED STATES PATENTS

| | | | |
|---|---|---|---|
| 1,571,134 | 1/1926 | Mittinger | 220/320 |
| 2,207,717 | 7/1940 | Carter | 74/5.1 |
| 2,278,913 | 4/1942 | Carter | 74/5.1 |
| 2,280,116 | 4/1942 | Carlson | 74/5.1 |
| 3,438,269 | 4/1969 | De Cotiis et al. | 74/5.12 |

*Primary Examiner*—Charles J. Myhre
*Assistant Examiner*—William C. Anderson
*Attorney, Agent, or Firm*—T. W. Kennedy; L. A. Wright

[57] ABSTRACT

A caging mechanism for a gyro in which a flat split ring lying in a plane perpendicular to the gyro rotor spin axis is deformable so that its inside diameter is enabled to capture the gyro rotor. A gas activated piston separates tabs formed on the split ring causing it to cage or uncage the rotor.

10 Claims, 12 Drawing Figures

TWO AXIS CAGING SYSTEM

This invention relates to a caging system for prealigning a gyro relative to its case.

BACKGROUND OF THE INVENTION

It is important in many tactical missle gyro applications to know very accurately the alignment of the rotor spin axis of the gyro relative to some external mounting or reference surface. In some of these applications, the vehicle may be constrained to fly a course parallel to the gyro spin axis, so that an error in the alignment of the spin axis is a direct aiming error. It is usually desirable to keep such errors below one milliradian. Caging is the technique by means of which the rotor of the gyro is brought into a predetermined attitude or relation with respect to the housing or frame of the gyro.

In U.S. Pat. No. 3,416,378 there is disclosed a method of caging in which three individual pads are employed to form the caging plane. These three pads retract from the surface of the gyro rotor to be aligned independently, releasing it and permitting freedom of motion of the gyro rotor. Although this method of caging has proven successful, it is possible that because of the independent action of the three pads that one or more of the pads may have a slight delay in retracting thereby giving a misalignment impulse to the rotor surface, causing an alignment error. The use of three independent caging pads require the duplication of pistons, pins, pads and springs as well as gas passages communicating between the caging pads. It is readily seen that such a system requires a relatively high parts count and is excessively costly.

BRIEF DESCRIPTION OF THE INVENTION

In a first embodiment, the present invention provides a caging mechanism in the form of a flat split ring. The inside diameter of the caging ring in its unstressed state is larger than the outside diameter of the gyro rotor. The caging ring may also be provided with tabs at the point of separation. In order to cage the rotor of the gyro the two tabs are brought together in an overlapping position making the inside diameter of the caging ring smaller than the outside diameter of the gyro rotor. This prevents the gyro rotor from rotating through an angle greater than that defined by its radius and the clearance between the ring and rotor. The means for releasing the tabs may be a piston activated by gas pressure or by a solenoid.

In a second embodiment of the invention, a split ring is positioned in a counter bore in the bore of the gyro housing. The caging ring is designed to have three flexure hinges displaced approximately 90° from each other. On each side of the split of the ring there is located an activating finger. Interposed between the fingers is a piston. The caging ring is contained in the housing and in its unstressed condition or caged position has an inside diameter smaller than the inside diameter of the housing and fits the housing inside diameter at two areas 90° and 270° apart from the activating fingers. A piston which activates the fingers fits in a bore on the periphery of the housing and is free to travel along an axis perpendicular to the plane of the ring. As the piston is advanced its conical surface separates the activating finger causing the ring to expand. The ring flexes at the three flexure hinges until the inside diameter surfaces of the caging ring conform to the inside diameter of the housing, releasing the gyro rotor. Accordingly, it is an object of this invention to provide a caging system to align a gyro rotor to a pedetermined position prior to its spin-up.

It is also an object of this invention to provide a caging system that requires less parts and is inexpensive to manufacture.

It is another object of this invention to provide a caging system to provide a positive instantaneous release of both axes of a two degree of freedom gyro.

It is a further object of this invention to provide a caging system to align a single degree of freedom gyro a two degree of freedom gyro, or a gimbal systems of either one or two degrees of freedom.

In order to gain a better understanding of the invention, as well as other objects and further features thereof, reference is made to the following detailed description of the invention to be read in conjunction with the accompanying drawing wherein.

The caging system of the invention is shown as employed in a two axis, free-rotor gas bearing gyro. It is understood however, that the caging system described herein may be used with a single degree of freedom gyro rotor or gimbal system of either one or two degrees of freedom. Moreover, the caging system of the invention may be used in systems in which the gyro rotor is driven by means other than by gas pressure.

Figure 1:
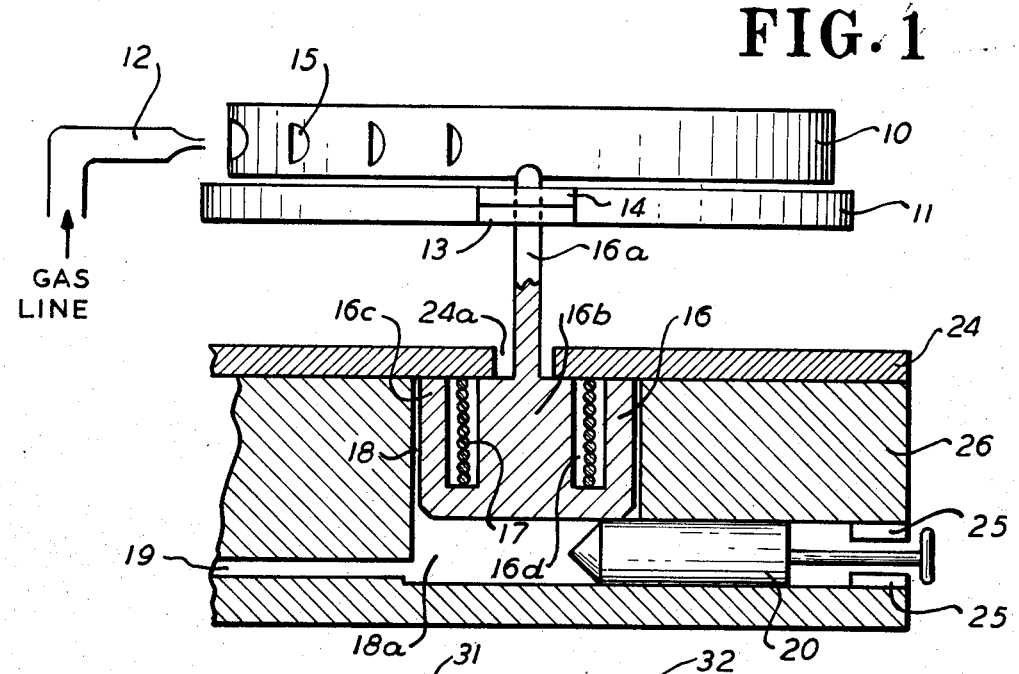
FIG. 1 is a fragmented sectional view of a first embodiment of the invention.

Referring now to FIG. 1, there is shown a fragmented sectional view of a first embodiment of the present invention. The caging ring 11 is supported on cylindrical gyro base 26 by suitable means such as in grooves or by means of a bracket (not shown). Overlying caging ring 11 is the gyro rotor 10. Gyro rotor 10 may have a plurality of turbine grooves formed in its periphery one of which is shown at 15. The grooves 15 are equispaced angularly about the axis of the rotor 10. Gyro rotor 10 has a gas drive means 12 which drives gyro rotor 10 to spin up at start up condition. Gas drive means 12 may be connected to a suitable source of gas (not shown). The caging ring 11 is a flat split ring as best seen in FIG.

2 and has an inner diameter in its unstressed condition somewhat larger than that of the gyro rotor. The caging ring has two tabs or fingers 13 and 14 formed at the split. The tabs 13 and 14 also contain holes 13a and 14a respectively through which the piston shaft pin 16a passes when the holes 13a and 14a of tabs 13 and 14 are aligned with each other. The shaft of piston 16 also passes through a hole 24a of circular cover plate 24 which fits over and conforms to the shape of gyro base 26. Caging piston 16 is received in a bore 18 located along the periphery of the gyro base 26 and the hole 24a of cover plate 24 is in axial alignment with the bore 18. Piston 16 is formed into an enlarged cylindrical portion 16b which moveably engages the walls of bore 18. Expanded portion 16b has turned back flange portions 16c that form an inner circular recess 16d. A spring 17 is mounted in circular recess 16d and urges the piston downward into bore 18 against a caging pin 20. When the caging pin 20 is moved to the right hand position a chamber 18a is formed which communicates to a gas line passage 19. A stop 25 prevents caging pin 20 from being expelled from the gyro casing upon the insertion of a source of gas into passage 19.

Figure 2:
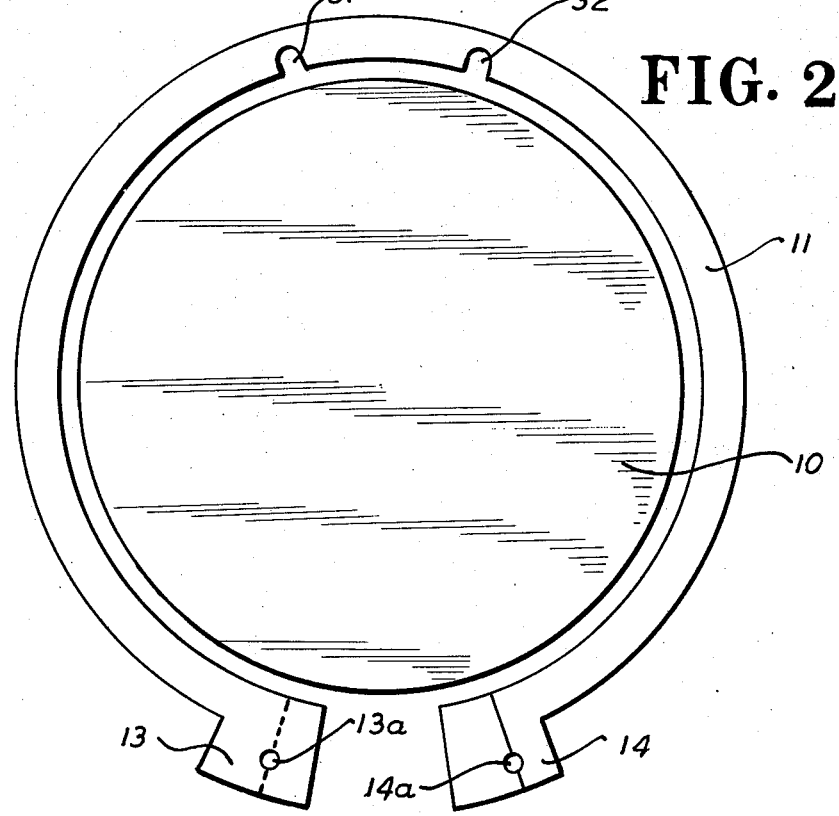
FIG. 2 is a plan view showing the caging ring and gyro rotor of FIG. 1.
Figure 3:
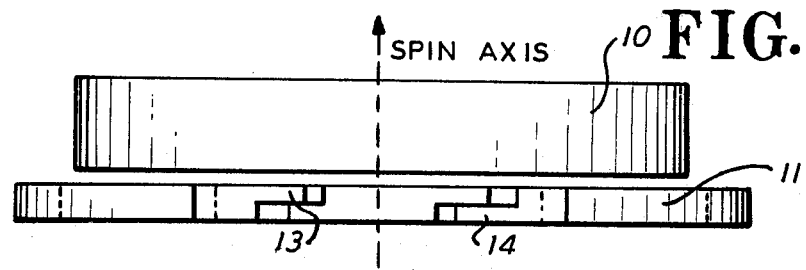
FIG. 3 is an elevational view of the caging ring and gyro rotor taken along the line 3—3 of FIG. 2.
Figure 4:
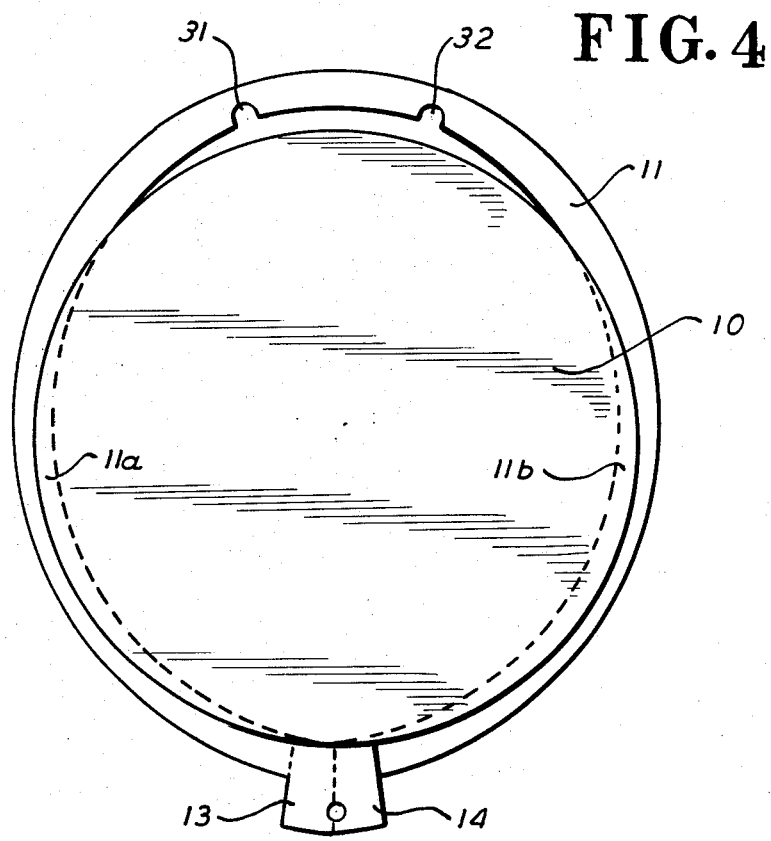
FIG. 4 is a plan view similar to FIG. 2 showing the rotor caged by the caging ring.
Figure 5:
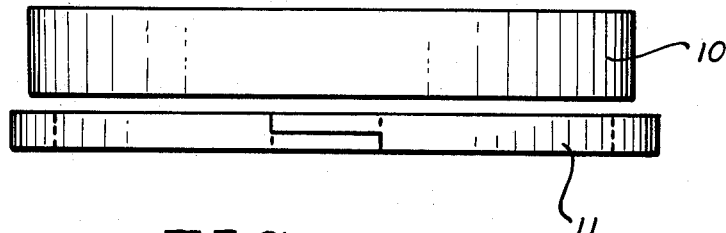
FIG. 5 is an elevational view of the caged position of the rotor taken along the line 5—5 of FIG. 4.

In FIGS. 2 and 3, rotor 10 is shown unrestrained by ring 11. As seen in FIG. 2, ring 11 has two flexure points 31 and 32. These flexure points serve the purpose of bending the ring when tabs 13 and 14 are pulled together in overlying relation. As seen from FIG. 3, the caging ring lies in a plane perpendicular to the spin axis of rotor 10. FIGS. 4 and 5 show the rotor 10 in the caged position. It is seen in these views that surface arcs 11a and 11b of the caging ring overlies the surface of the rotor.

In order to cage the gyro 10 the two tabs 13 and 14 are brought together so that they overlap. Bending occurs at the grooves 31 and 32 and the inside diameter of the ring under the rotor in two arcs capturing it. In this position of caging ring 11 the rotor 10 is unable to rotate through an angle greater than that defined by its radius and the clearance between the caging ring and the rotor. In order to hold the tabs 13 and 14 together a piston pin 16a is pushed into the holes 13a and 14a (FIG. 2).

Turning again to FIG. 1, when an activating signal is received compressed gas is released into passage 19 and also to rotor drive means 12. The gas from drive means 12 strikes the rotor 10 tangentially and causes it to spin up rapidly. In FIG. 1 as in the other figures the space between the rotor 10 and the caging ring 11 is exaggerated. In an actual construction, it would be quite close together and prior to beginning spin-up at least one point of the rotor would be touching the caging ring. The gas supply to passage 19 leads to the cavity beneath the caging piston 16. The pressure in this cavity rapidly increases causing the caging pin 20 to be driven to the right. Prior to the insertion of the gas in passage 19 the caging pin 20 had served the purpose of holding the caging piston 16 up during transportation and storage. However, when the gas pressure in the cavity became high enough to force caging pin 20 to the right, it was also high enough to hold the piston 16 up against cover plate 24 against the urging of spring 17. Under this condition the caging piston 16 is unable to fall or move downward. As the spin-up gas supply is continuously drained by the nozzle directed at the rotor, the pressure on caging piston 16 in bore 18 starts to drop. When the pressure in bore 18 falls below the force of coiled spring 17, the caging piston moves downwrd in bore 18 releasing its pin from the holes 13a and 14a of tabs 13 and 14. Thus, caging ring is no longer constrained and snaps open to its relaxed position, uncaging gyro 10.

It should be noted from FIG. 4, that the surface area contacting the rotor and caging ring is large. This condition is beneficial since it tends to reduce wear and controls undesired vibration during the spin-up function. Moreover, it should be noted that gas actuation of the caging piston could be performed by electromagnetic devices (e.g. a solenoid) or by a pyrotechnic actuator.

Figure 6:
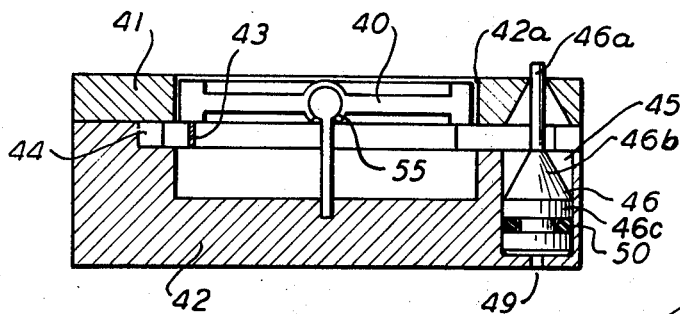
FIG. 6 is a sectional view of a second embodiment of the invention.

A second embodiment of the caging system of the invention is shown in FIG. 6–12. Turning to FIG. 6, there is shown caging ring 43, piston 46 and cylindrical housing 42. Cover plate 41 has a circular shape conforming to the shape of housing 42 and fits over housing 42. Housing 42 supports the above elements as well as rotor 40 which has an air bearing 55 which is centrally mounted in bore 42a of the cover 41. The ring 43 is disposed in counterbore 44 of housing 42 and is maintained within the housing by cover plate 41. Caging ring 43 is free to move in counterbore 44 and is shown in the caging position in FIG. 6. Caging piston 46 has a shaft portion 46a, a conical portion 46b and a cylinder portion 46c. Around the cylinder portion of the piston is an O-ring 50 employed as a seal. At the base of the bore 45 in which the piston 46 is disposed is a gas passage 49 in which the activating gas is inserted.

Figure 7:
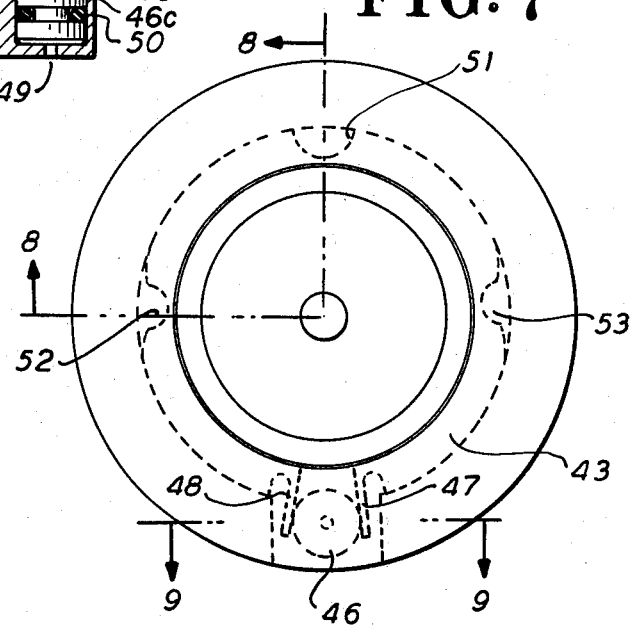
FIG. 7 is a plan view showing the caging ring and gyro rotor of FIG. 6.
Figure 8:
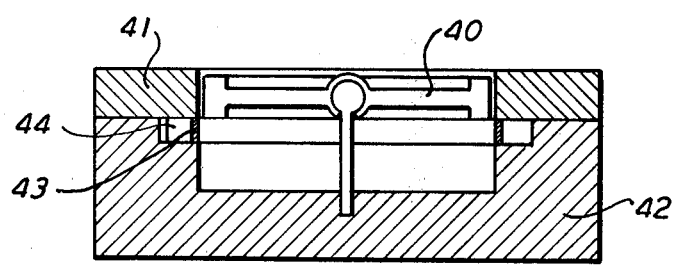
FIG. 8 is a sectional view showing the caging ring and gyro taken along the line 8—8 of FIG. 7.
Figure 9:
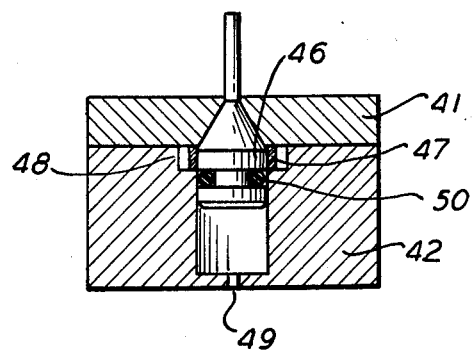
FIG. 9 is a sectional view taken along the line 9—9 of FIG. 7 showing the ring tabs and activating piston in the extended position.

In FIG. 7 there is shown a plan view of the caging system. This view shows flexure points 51, 52 and 53 which are spaced 90° from each other around the periphery of caging ring 43. Tabs or fingers 47 and 48 are formed at the split of caging ring 43. Piston 46 is in the upward or engaged position as shown in FIGS. 7 and 9. Under these conditions, caging ring 43 is under stress and has its inside diameter relatively clear of the outside diameter of counterbore 44 of housing 42. As seen more clearly in FIG. 8 caging ring 43 now clears rotor 40.

Figure 10:
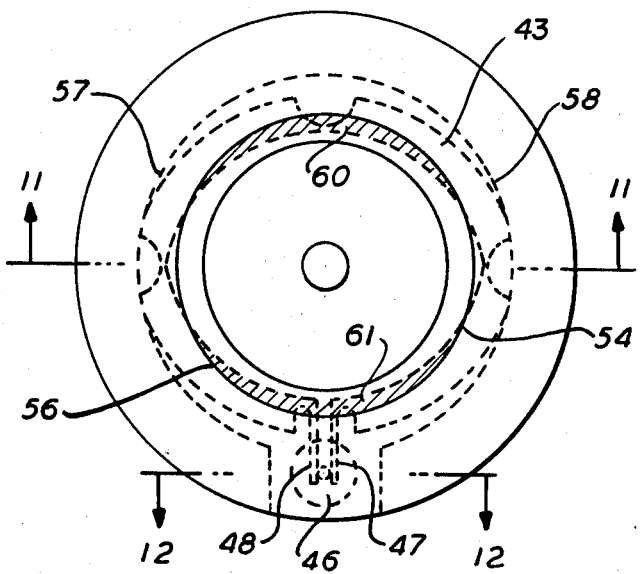
FIG. 10 is a plan view showing the caging ring and rotor in the caged position.
Figure 11:
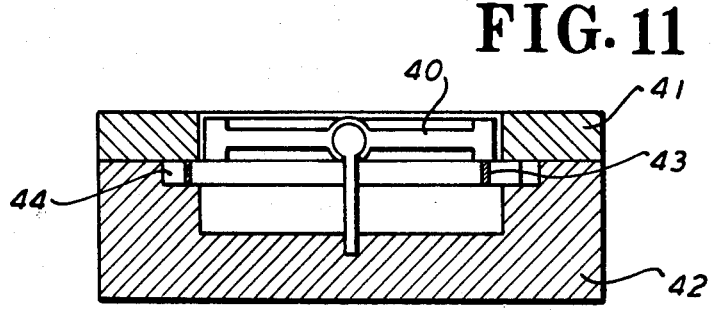
FIG. 11 is a sectional view taken along the line 11—11 of FIG. 10 showing the ring tabs and activating piston in the retracted position.
Figure 12:
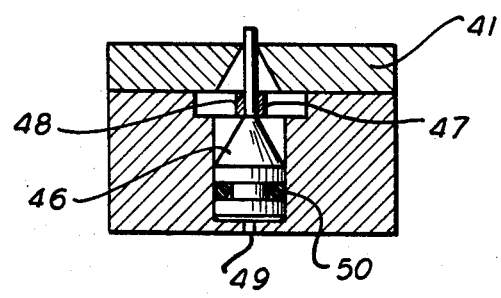
FIG. 12 is a sectional view taken along the line 12—12 of FIG. 10 showing the ring tabs and activating piston in the retracted position.

In FIGS. 10, 11 and 12 caging piston 46 is shown retracted or in its downward position. In the plan view of FIG. 10 fingers 47 and 48 are pressed against the narrow shaft portion of piston 46. Because of flexure points 51, 52 and 53 formed in caging ring 43, the caging ring now presents an elliptical configuration and pivot points are established at points 54, 56, 57 and 58. That is, the section of the ring between flexure points tend to individually and independently rotate about these pivot points forcing the ring to take an elliptical configuration. This is the unstressed position of the caging ring and results in caging of the rotor 40 at the arc surfaces shown in shading at 60 and 61.

FIG. 11 shows that in the caged position the ring at certain points is forced flush against the wall of counterbore 44 while other points, e.g. 60, the surfaces of the rotor 40 and the caging ring are in contact.

Prior to operation caging ring 43 is closed in toward the center of rotor 40. This is the free unstressed position of the caging ring. In this position the caging ring forms an elliptical opening where the minor dimension is less than the diameter of rotor 40 thereby caging the rotor. The overlap of these dimensions forms contacting arc surfaces between the ring and the rotor. The translation of the caging ring from the caged to uncaged positions causes the four sections of the ring to rotate about pivot points on each section. These points are formed by the intersection of the caged and uncaged outside diameter.

The operation of the embodiment of FIGS. 6–12 is as follows, as the piston 46 is advanced upward by gas pressure applied to gas passage 49 its conical surface separates tabs or fingers 47 and 48 causing the ring 43 to expand. The ring flexes at the three hinges 51, 52 and 53 until the four released sections of the ring outside diameter surfaces conform to the inside diameter of the bore of the housing. At this point, motion of the ring stops and further travel of the piston causes the fingers 47 and 48 to deflect spring loading them against the side of the piston. Travel of the piston is limited by contact of the piston with the retaining plate 41. With caging ring 43 in the stressed or uncaged position, the inside diameter forms a circle which is concentric to the outside diameter of rotor 40 thereby permitting clearance between the caging ring and the rotor.

From the foregoing a caging system suitable for aligning a two degree of freedom gyro that is simple in construction and inexpensive to produce has been described. It has also been demonstrated that the caging system of the invention provides a positive instantaneous release of both axes of a two degree of freedom gyro.

While the present invention has been described in preferred embodiments, it will occur to those skilled in the art that various modifications can be made therein within the scope of the invention. It is intended that the appended claims cover all such modifications.

What is claimed is:

1. A caging system for a gyro having a rotor comprising:
    a. a split ring having a flexure portion about which said ring is permitted to bend,
    b. a tab at each end of said ring,
    c. means for driving said tabs from a first to a second spatial separation between said tabs including means interposed between said tabs and operable for moving said tabs from said first to said second spatial separation between tabs and a source of gas acting on said means interposed between said tabs for driving said tabs from said first to said second spatial separation, whereby said ring presents a surface to a surface of said gyro rotor to maintain said gyro rotor in a plane constant to the plane of said ring.

2. A caging system for a gyro rotor comprising:
    a base,
    a split ring having an inside diameter in a first position greater than the outside diameter of said gyro rotor and in a second position presenting a surface to a surface of said gyro supported on said base,
    a pair of tabs formed at end portions of said ring,
    means interposed between said tabs for maintaining a first and second spatial separation between said tabs, and
    means for driving said separating means from a first to a second spatial separation between said tabs whereby said gyro rotor is maintained in a predetermined position relative to said ring.

3. A caging system for pre-aligning a free gyroscope relative to its case comprising:
    a base,
    a split ring having an inside diameter in a first position greater than the outside diameter of the rotor of said gyroscope and in a second position presenting a surface to the surface of the rotor of said gyroscope,
    a tab situated on each end of said ring member said tabs being urged apart by spring forces inherent in said ring, and
    means interposed between said tabs for permitting said ring to contact said rotor in a first position and to remove said ring from said rotor in a seond position whereby said rotor is maintained in a plane constant to the plane of said ring.

4. The apparatus of claim 3 comprising:
    a plurality of flexure portions about the periphery of said ring member about which said ring is permitted to bend.

5. The apparatus of claim 4 comprising:
    means for driving said separation means from said first position to said second position.

6. The apparatus of claim 4 wherein said flexure portions divide said ring into four sections and said ring sections act independently of each other upon actuation.

7. The apparatus of claim 6 wherein said driving means comprises a source of gas acting on said means interposed between said tabs.

8. A caging system for a gyro rotor comprising:
    annular means having an inside diameter in a first position greater than the outside diameter of said rotor the surface of said annular means mounted in a plane perpendicular to the spin axis of said rotor, and
    means for deforming the inside diameter in a first annular means whereby said annular means restricts the movement of said rotor from rotating through an angle defined by its radius and the clearance between said member and said rotor.

9. In a two degree of freedom gyro rotor a caging system for aligning the rotor to a predetermined position relative to its casing comprising:
    deformable means having an inside diameter in a first position greater than the outside diameter of said rotor and in a second position having an inside diameter less than the outside diameter of said rotor said means lying in a plane perpendicular to the spin axis of said rotor and said deformable means caging said rotor in said second position restricting the movement of said rotor from rotating through an angle defined by its radius and the clearance between said deformable means and said rotor.

10. In a two degree of freedom gyro rotor, a caging system for aligning the rotor to a predetermined position relative to its casing comprising:
    a base supporting said gyro rotor,
    a split ring supported on said base in proximity to said gyro rotor and base lying in a plane perpendicular to the spin axis of said rotor,
    a tab formed on each end of the split of said ring, and
    a gas activated piston interposed between said tabs for deforming the inner diameter of said ring whereby surfaces of said rotor and ring are in contacting relation preventing movement of said rotor.

* * * * *